Jan. 11, 1938.    C. DE LA BARRE DE NANTEUIL    2,105,186
VARIABLE SPEED POWER TRANSMITTING DEVICE
Filed May 16, 1936    3 Sheets-Sheet 1
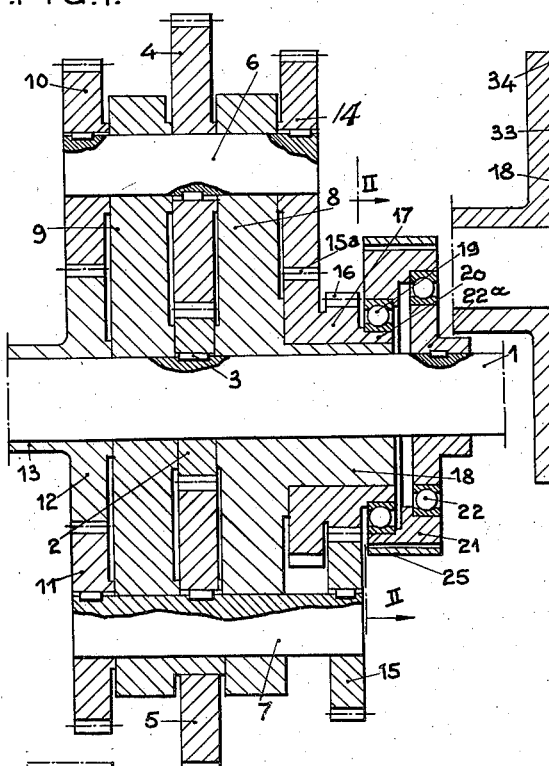
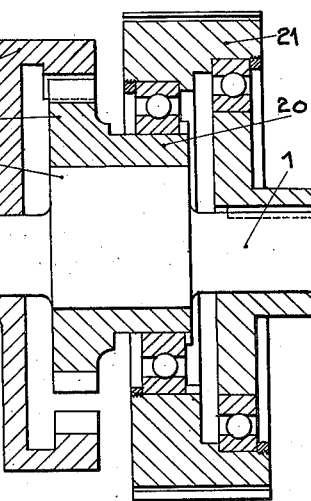
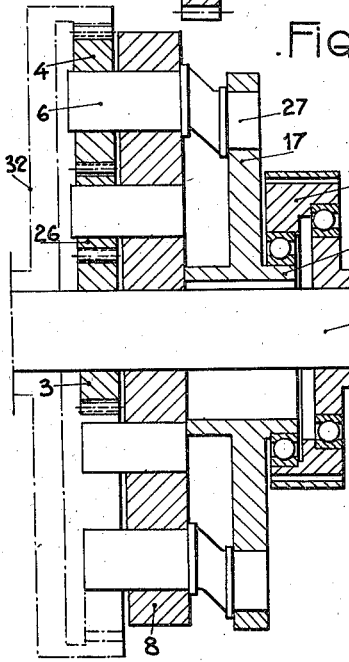
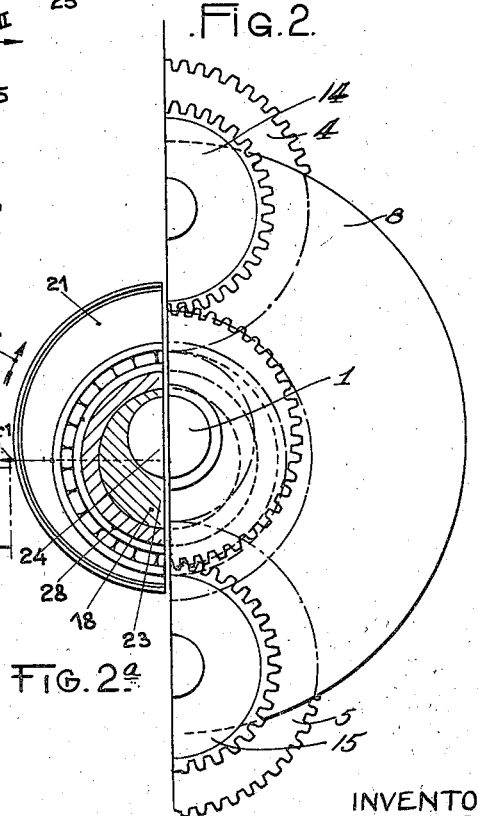
INVENTOR:
CHRISTIAN DE LA BARRE DE NANTEUIL
BY Haseltine Lake & Co
ATTORNEYS Jan. 11, 1938. C. DE LA BARRE DE NANTEUIL 2,105,186
VARIABLE SPEED POWER TRANSMITTING DEVICE
Filed May 16, 1936 3 Sheets-Sheet 3

INVENTOR:
CHRISTIAN DE LA BARRE DE NANTEUIL
BY Haseltine, Lake & Co.
ATTORNEYS

Patented Jan. 11, 1938

2,105,186

UNITED STATES PATENT OFFICE 2,105,186

VARIABLE SPEED POWER-TRANSMITTING DEVICE

Christian de la Barre de Nanteuil, Versailles, France

Application May 16, 1936, Serial No. 80,116
In France May 21, 1935

5 Claims. (Cl. 74—290)

Change speed gears are known which are substantially constituted by an epicyclic gear one of the elements of which (sun wheel, or plate carrying the planet pinions) is actuated by a driving shaft, whilst another of these elements actuates the driven shaft, the third being subjected to a braking stress adjustable at will, for allowing the actuation of the driven or receiving shaft at variable speeds. The inconvenience of such a system precisely resides in this braking action, which considerably reduces the efficiency of such apparatus, this efficiency becoming acceptable only when the braking action is sufficient for completely stopping the motion of the member on which it is exerted.

For avoiding this inconvenience as much as possible, it has already been proposed to replace the brake by a worm and worm wheel device, the inclination of the worm being so chosen that the system is at the limit of reversibility, or very near this limit. If the system were irreversible, the change of speed would occur by causing the irreversible worm or the irreversible worm wheel to rotate. If, on the contrary, the system is reversible, the change of speed will take place by checking or braking the rotation of the reversible worm or of the reversible worm wheel; but this external braking will obviously be so much the less intense as the system is nearer the limit of irreversibility. The inconvenience of such a system is the mechanical complication resulting from the use of a worm and worm wheel.

The main object of the invention is to avoid this inconvenience, that is to say to avoid the use of a worm and worm wheel. It is mainly characterized by the fact that the member of the epicyclic gear, the movement of which must be controlled by an external friction, actuates with an eccentric movement a journal eccentrically fitted within an intermediate member capable of rotating; the value of the eccentricity is chosen, according to the friction coefficients and to the space available, in order that the system should be as near as possible to the limit of irreversibility; when the system is irreversible, the receiving shaft is normally actuated on direct drive, and the braking of the intermediate member causes it to be actuated with a gearing down ratio; when the system is reversible, the receiving shaft is normally disengaged and the braking of the intermediate member causes it to be driven with a gearing down ratio. Both modes of operation can moreover be combined, and in both cases, the braking action to be exerted is extremely small.

The accompanying drawings illustrate, by way of example, some embodiments of the invention.

Fig. 1 is a sectional elevation of a first embodiment and Fig. 2 is a partial side view.

Fig. 2a is a partial section on the line II—II of Fig. 1.

Fig. 7 is a sectional elevation of a second embodiment.

Fig. 8 is a sectional elevation of a third embodiment.

Figure 3:
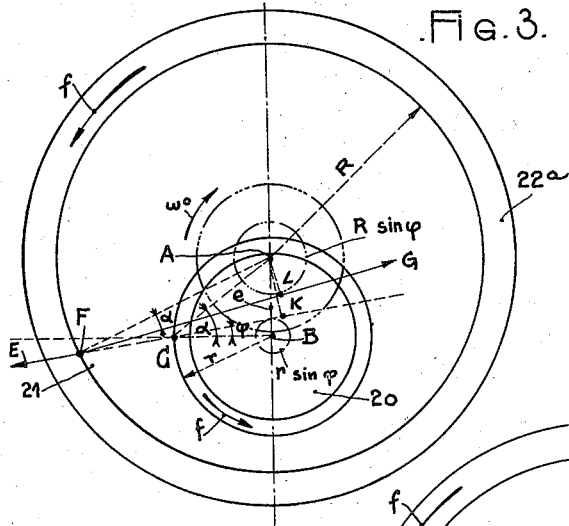
Fig. 3 is an explanatory diagrammatic view.

In the form of construction illustrated in Figs. 1 and 2, on the driving shaft 1 is rigidly secured, for instance by means of a key 3, a sun wheel 2. The sun wheel 2 meshes with planet pinions 4 and 5, shown as being two in number, but which might of course be more numerous, or, on the contrary, reduced to one. The spindles 6 and 7 of the planet pinions 4 and 5 are carried by plates 8 and 9 loosely rotating on shaft 1. The spindles 6 and 7 freely rotate in the plates 8 and 9 and they extend beyond both sides of these plates.

On one side, they carry pinions 10 and 11, which mesh with the driven sun wheel 12. The driven shaft is indicated at 13.

On the other side, the spindles 6 and 7 carry pinions 14 and 15 respectively meshing with the teeth 15a and 16 of a third sun wheel 17 loosely mounted on an eccentric boss 18 carried by plate 8. For greater clearness, it will first be assumed that the ratios of the teeth are so established that, if the plates 8 and 9 were assumed to be fixed, the sun wheels 12 and 17 would rotate at the same speed, although the axis of rotation of 17 is not the same as the axis of rotation of 12. Finally, the journal 20 of sun wheel 17 is fitted, through a ball bearing 19, in a member 21 supported by a ball bearing 22 concentric with shaft 1.

In the diagrammatic view of Fig. 2, the journal 20, member 21 and bearing 22 are illustrated. The latter is herein shown as a smooth bearing external to member 21, but it is shown as being internally arranged in Fig. 1, and inner crown wheel 22a shown in Fig. 1 rotates with the driving shaft.

Let $f$ be the direction of rotation of the engine (Fig. 3). If the plates 8 and 9 are assumed to be fixed, the journal 20 will rotate in the direction of the arrow $f$, but about the axis B, whereas the crown wheel 22a rotates about the axis A.

It will be further noted that the plates 8 and 9 are subjected to a stress tending to cause them to rotate in reverse direction to the driving shaft, as will readily be seen by applying to the epicyclic gear thus constituted the well known relation (Willis):

$$\rho = \frac{\omega_n - \omega_o}{\omega_l - \omega_o}$$

in which:
$\rho$ designates the ratio of the epicyclic gear
$\omega_l$ the speed of the driving pinion
$\omega_n$ the speed of the driven pinion
$\omega_o$ the speed of gyration.

It is then found that:

$$\rho\omega_l - \rho\omega_o = \omega_n - \omega_o$$

$$\rho\omega_l - \omega_n = (\rho - 1)\omega_o$$

$$\frac{\rho\omega_l - \omega_n}{\rho - 1} = \omega_o$$

The ratio $\rho$ being in this form of construction smaller than 1, and the speed of the driven shaft, to which the resistant torque is applied, naturally tending towards zero, it will be seen that $\omega_o$ is negative, that is to say the plates 8 and 9 tend to rotate in a direction reverse to $f$. Therefore, the axis B tends to rotate about A in a direction reverse to that indicated by the arrow $f$.

The stress tending to produce this gyration is exerted at C on member 21, the radius BC being at right angles to the eccentricity AB. Owing to the fact that the pinion 20 rotates in the direction of the arrow $f$, the stress exerted at C is inclined according to the friction angle $\varphi$ relatively to the radius BC. This stress E encounters at F the bearing 22 which exerts a radial reaction, that is to say a reaction directed according to FA, but again inclined according to the friction angle $\varphi$ owing to the rotation of the crown wheel 22a in the direction of the arrow $f$. The reaction is therefore directed towards G.

Three cases can occur:
—either the resultant of E and of G is positive (direction of $f$),
—or it is null,
—or it is negative (direction reverse to $f$).

It is first to be mentioned that the second case can occur only for a strictly determined value of $\varphi$. Now, in practice, $\varphi$ is variable between certain narrow limits. This case is therefore purely theoretical and corresponds moreover to a position of instability which must be approached as much as possible, as will be explained, without however reaching it.

It is therefore important to determine the conditions of this position of instability.

A perpendicular AL is dropped to FG and a perpendicular AK is dropped to CE. The condition of null resultant signifies that CE and FG are on the same straight line, therefore that:

$$AL = AK \quad (1)$$

Now:

$$AL = R \sin \varphi$$

R being the radius of the bearing.

$$AK = AC \sin (\alpha - \varphi)$$

$\alpha$ being the angle $\widehat{ACB}$
(1) becomes therefore:

$$R \sin \varphi = AC \sin (\alpha - \varphi) \quad (2)$$

But $$AC \cos \alpha = r$$

$r$ being the radius of the journal 20. Therefore $$R \sin \varphi = \frac{r}{\cos \alpha} \sin (\alpha - \varphi)$$

$$= \frac{r}{\cos \alpha} (\sin \alpha \cos \varphi - \sin \varphi \cos \alpha)$$

$$= r \, tg \, \alpha \cos \varphi - r \sin \varphi$$

$$(R + r) \sin \varphi = r \, tg \, \alpha \cos \varphi$$

$$(R + r) \, tg \, \varphi = r \, tg \, \alpha = e$$

$e$ being the eccentricity AB.

The resultant of E and G will be positive when:

$$e < (R + r) tg \varphi'$$

$\varphi'$ being the smallest value assumed in practice by $\varphi$, and the resultant will be negative when:

$$e > (R + r) tg \varphi''$$

$\varphi''$ being the greatest value assumed in practice by $\varphi$.

These two practical cases are very different from each other by the effects obtained and must be studied separately.

*1st case.*—$e < (R + r) tg \varphi'$

In this case, it is obvious that, in the absence of any other external force, the member 21 is driven in the direction of rotation of the engine, and, consequently, the axis B rotates about A in the direction of the engine and at the same speed. Therefore, $\omega_o = \omega_l$ and consequently $\omega_n = \omega_l$. It is the direct drive, and everything exactly occurs as if the shafts 1 and 13 were rigidly connected to each other.

The eccentricity $e$ is so chosen that it approximates $(R + r) tg \varphi'$. In these conditions, the torque driving the member 21 (and consequently, the plates 8 and 9) is only a very small fraction of the torque transmitted by the engine to the driven shaft. Therefore, a small braking stress exerted on member 21 by means of the brake 25, will be sufficient for slowing down its movement or even for stopping it, that is to say for causing $\omega_o$ to pass from its maximum value which is $\omega_l$ to zero. This variation in the value of $\omega_o$ also causes $\omega_n$ to vary, $\omega_n$ passing from the value $\omega_l$ (when $\omega_o = \omega_l$) to $\rho\omega_l$ (when $\omega_o = 0$). A progressive change of speed, between the speeds $\omega_l$ and $\rho\omega_l$ for the driven shaft is thus ensured, and this result has been obtained by a very small external braking stress. The efficiency therefore remains very satisfactory, even during the intermediate periods between the extreme speeds. For these latter, there is no loss of energy since: either there is no braking (direct drive), or the braking definitely stops the member 21 (minimum speed) and there is no friction.

*2nd case.*—$e > (R + r) tg \varphi'$

In this case, the member 21 can rotate in a direction reverse to $f$, but the driving torque applied on said member is small. If no antagonistic stress is opposed to this rotation, the shaft 13 remains stationary, and the system is disengaged, that is to say the speed of the driven shaft is null. On the contrary, for a small antagonistic stress, exerted for instance by the brake 25, the member 21 can be held completely stationary; at this moment, the driving stress, increased by the gearing down ratio produced by the epicyclic gear is entirely applied to shaft 13, which rotates at the speed $\rho\omega_l$. For a stress comprised between 0 and the value which stops the member 21, the latter rotates at a greater or less speed, and, consequently, the shaft 13 rotates at a more or less reduced speed. The change of speed is therefore effected by operating the brake 25.

Thus, according to the relative value of $e$, on the one hand and of $(R+r)$, on the other hand, the speed of the driven shaft can be caused to vary either from 0 to $\rho\omega_1$, or from $\rho\omega_1$ to $\omega_1$. Variations of speed from 0 to $\omega_1$, can be easily obtained by utilizing not a single bearing 22, but two bearings, the inner crown wheels of which have different radii R and which can be separately keyed or coupled to the driving shaft, by means of a suitable drive.

It is only for facilitating the explanation of the operation of the apparatus that it has been assumed that the journal 20 was rotating at the same speed as the driven shaft 13. But this condition is not in any way necessary; it is only preferable that this journal should receive a rotation in the same direction $f$ as the driving shaft, for inclining according to CF the reaction exerted on member 21. In the reverse case (that is to say if the journal 20 did not rotate, for instance by dispensing with the pinions 14, 15, 16 or was rotating in a direction reverse to that of the driving shaft), it would be seen that the preceding relation (2):

$$R \sin \varphi = AC \sin (\alpha - \varphi) \qquad (2)$$

would be replaced by the relation $$R \sin \varphi = AC \sin (\alpha + \varphi) \qquad (3)$$

which would finally give:

$$e = (R-r) tg\varphi$$

and would consequently lead to too small values for $e$. However, arrangements of this nature are included in the scope of the invention, although so small values of $e$ are a practical inconvenience.

Figure 4:
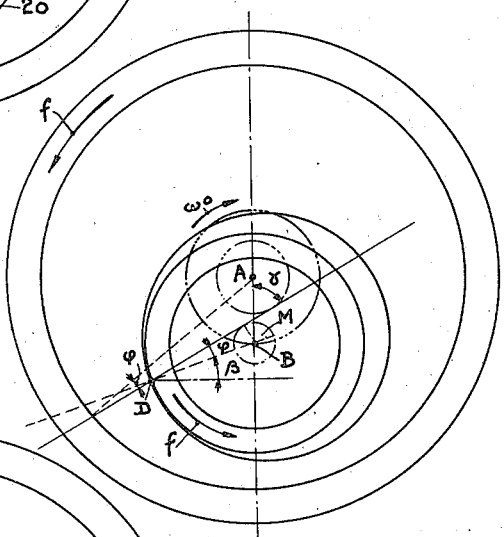
Figs. 4, 5 and 6 are diagrammatic views of modifications.

The invention moreover includes in its scope a means allowing to increase the eccentricity whilst maintaining the condition of irreversibility. These means consist in devising the member 21 in such a manner that the contact between the eccentric journal 20 should no longer take place at C on the perpendicular BC to the eccentricity AB, but at another point D as shown in Fig. 4, the direction of rotation of the axis B about the axis A being always in the opposite direction to the arrow $f$. The inner bore of member 21 then has its center at M in order to be tangent at D to the journal 20.

In this case, which is the general case, it is obviously found that the condition of irreversibility is fulfilled when:

$$AB \sin \gamma = R \sin \varphi + r \sin \varphi \qquad (4)$$

But:

$$AB = e$$

$$\gamma = \frac{\pi}{2} - (\varphi + \beta)$$

$$\sin \gamma = \cos (\varphi + \beta)$$

Therefore:

$$e \cdot \cos (\varphi + \beta) = (R+r) \sin \varphi$$

$$e = (R-r) \frac{\sin \varphi}{\cos (\varphi + \beta)} \qquad (5)$$

It will be seen that this formula gives that first found, in the case of Figure 3, in which $$\alpha = \frac{\pi}{2}$$

and in which, consequently, sin $$\left(\frac{\pi}{2} + \varphi\right) = \cos \varphi$$

The minimum $e$ occurs for $\sin \cos.(\varphi+\beta)=1$, that is to say for $\beta=\varphi$, and as $\varphi$ is relatively small, the arrangement of Fig. 3 corresponds to that which necessitates for $e$ the smallest value. On the contrary, when $\cos (\beta+\varphi)=0$, that is to say when:

$$\beta = \frac{\pi}{2} - \varphi$$

this being in practice equivalent to $$\beta = \frac{\pi}{2}$$

as $\varphi$ is always small (Figure 5), $e$ can assume any value different from zero since in (5) it is found that:

$$e = \frac{(R+r) \sin \varphi}{0} = \infty$$

In this case, the system is irreversible whatever may be the value of $e$.

Figure 6:
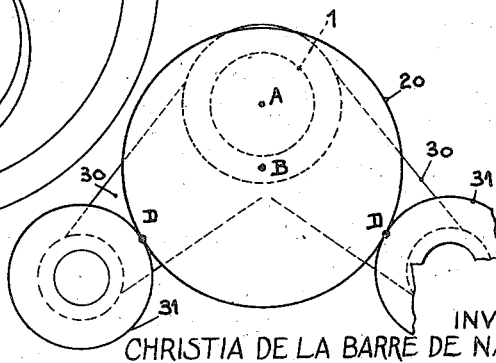

For carrying out the arrangement shown in Figure 4, it is convenient to use the means illustrated in Figure 6, in which the member 21 is replaced by a double lever 30, loosely supported by the driving shaft 1, and receiving rollers 31 bearing at D on the eccentric journal 20. The theory is identically the same, of course, as in Figure 4, as will be easily understood.

In the example shown in Figures 1 and 2, the regulation is effected by acting on the plate of the epicyclic gear, the driven shaft being driven by a sun wheel of this epicyclic gear. The regulation might quite as well be effected on a sun wheel, and the driving shaft might be driven by the plate of the epicyclic gear. By way of example, Fig. 7 illustrates a form of construction of this kind, in which the driving shaft 1 still actuates the sun wheel 3 which, in its turn, meshes with planet-pinions such as 4, through the medium or not of another gear 26. The spindles such as 6 of the planet pinions 4 form crank pins of eccentric cranks 27 which support a member similar to 17 and provided with the eccentric journal 20, as in the example illustrated in Figs. 1 and 2. In these conditions, the journal 20 exerts on member 21 exactly the same stresses as in the preceding examples, the plate 8 actuating the driven shaft.

The connection effected between the shaft 6 and the journal 20 is such that the gyration of the journal 20 (the plate 8 being assumed stopped and the journal 20 free) obviously takes place at the same speed as the rotation of shaft 6. Everything therefore occurs as if the journal 20 belonged to a wheel driven through gears by shaft 6, with ratio $+1$ for the first set of gears. In order that the plate 8 should be driven in the same direction as the driving shaft, it is then necessary, as would easily be seen by a simple calculation, that the ratio between 3 and 4 should be negative, the magnitude of this ratio intervening only for obtaining the required gearing down ratio, or that this ratio should be positive (use of the intermediate wheel 26), but then greater than 1. If it was smaller than 1, the plate would rotate in a reverse direction to the driving shaft, and, on the other hand, the operation such as it is described is not possible if this ratio was equal to 1, the member 21 always necessarily rotating at the same speed as shaft 1. But, even in this case, the apparatus is capable of operating, although in a manner different from those already described, provided use is made as receiving element, no longer the plate 8, but an internally toothed crown wheel 32 meshing with the pinions 4. Whatever may be the speed of rotation of plate 8, the member 21 always rotates at the same speed as shaft 1, and the speed of rotation of plate 8, the driven shaft being assumed to be stopped, is determined by the number of teeth of the wheels 4 and 32. By causing the speed of rotation of plate 8 to vary, that of the receiving shaft will be caused to vary.

Now, the speed of the member 21 is due to the composition of (1) the rotation of plate 8, and (2) the circular translation of the pinion 20, which corresponds to the rotation of shaft 6 in plate 8.

If the member 21 forms an irreversible connection, the circular translation cannot normally take place; therefore, the plate 8 rotates at the speed of the driving shaft, the shaft 6 does not rotate, and the crown wheel 32 is driven on direct drive. No variation of speed can be obtained by exerting a braking action on member 21, this braking action further increasing the irreversibility. On the contrary, if the member 21 is reversible the circular translation can take place; normally, the system is therefore disengaged. The plate 8 rotates at a speed which depends on the ratio between 4 and 32, and the shaft 6 also rotates in the plate 8. But, by then exerting a braking action on member 21, with a stress which is so much the more smaller as the system is nearer to irreversibility, this irreversibility is ensured and the circular translation of member 20 is thus prevented from taking place. The conditions existing in the first case are again reached, and direct drive is attained. By variation of the braking stress on member 21, all the speeds are therefore passed through, from declutching to direct drive. It is true that the member 21 always rotates at the speed of shaft 1, and that during operation (except upon declutching), a braking stress is usually exerted on said member 21, this braking stress being a maximum for direct drive; but, even at this maximum value, the braking stress exerted is very small, and is so much the more smaller as the system is nearer to the limit of irreversibility and it is consequently without practical inconvenience.

The device illustrated in Fig. 8 is a modification and a simplification of that which has just been described. In this case, the journal 18 is directly secured on the driving shaft 1, and the sleeve 28, loosely mounted on the same, carries a wheel 33 meshing with an internally toothed driven crown wheel 34. It will then be understood that, on the journal 18, the wheel 33 tends to rotate in a direction reverse to the driving rotation assuming, of course, that the driven element 34 is stopped.

As in the case of Fig. 7, it is herein necessary that the member 21 should form a reversible connection, but as near as possible to irreversibility. If no braking stress is exerted on this member 21, the latter rotates at the speed of shaft 1, but does not prevent the loose rotation of wheel 33. The system is therefore disengaged. But it will be understood that a small braking stress is sufficient for reaching irreversibility; at this moment, the wheel 33 cannot rotate on the journal 28, and direct drive is obtained, the wheel 34 being driven at the same speed as the driving shaft. By causing the braking stress to vary, all the intermediate speeds are of course passed through.

Figure 5:
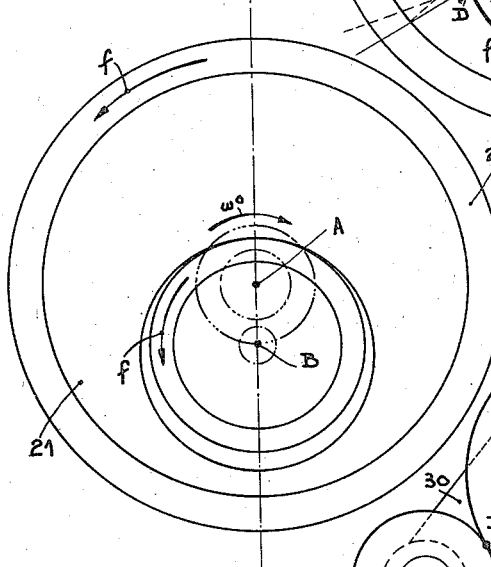

Finally, it will be noted that the devices described with reference to Figs. 3, 4 and 5 constitute new free wheels or movement selecting apparatus, which are included in the scope of the invention, as well as all their applications. Therefore, the principle of the invention would not be departed from by replacing the eccentric journal 20 and the member 21 by a centered journal and wedging or propping members which could be disengaged by an external friction.

Figure 9:
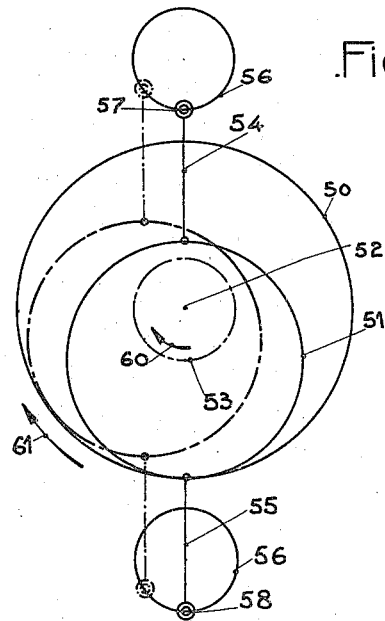
Figs. 9 and 10 are diagrammatic views of modifications.
Figure 10:
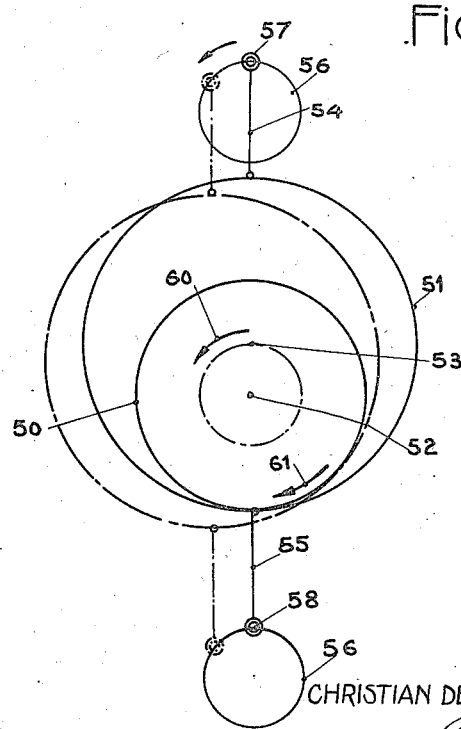

Figs. 9 and 10 diagrammatically illustrate forms of construction in which (Fig. 9) the driven shaft rotates in the same direction as the driving shaft and (Fig. 10) the driven shaft rotates in reverse direction to the driving shaft.

In the example of Fig. 9, the driven member 50 rotates about the axis 52 and is driven by the driving member 51 which receives a circular movement of translation about the axis 52. The axis 53 of member 51 moves with a gyratory movement about the axis 52. The circular translation of member 51 can be effected through the medium of links 54 and 55 the ends 57 and 58 of which regularly move on circular paths 56. The circular movement of translation of member 51 taking place in the direction of the arrow 60, it causes a movement of rotation of the driven member 50 in the direction of the arrow 61, the arrows 60 and 61 being in this case directed in the same direction.

In the example shown in Fig. 10, the driven member 50 is arranged within the driving member 51 which receives a circular movement of translation in the direction of the arrow 60. This driving member 51 is guided, as in the first case, by links 54 and 55, the free ends 57 and 58 of which move according to circular paths 56. The circular movement of translation of the member 51, in the direction of the arrow 60, causes a movement of rotation of the driven member 50 about the axis 52, in the direction of the arrow 61. In this case, the arrows 60 and 61 are directed in reverse directions.

What I claim as my invention and desire to secure by Letters Patent is:

1. In a power-transmitting device, a driving shaft, a driven shaft, a rotating member freely mounted on the driving shaft and mounted to turn about the same axis as the driving shaft, an eccentric journal engaging with the said rotating member mounted to turn about an axis eccentric to its center and the same as that of the driving shaft, means driven by the driving shaft for causing said journal to move about the driving shaft, means for kinematically connecting said journal to the driven shaft, and means for exerting a variable braking action on the rotating member.

2. In a power-transmitting device, a driving shaft, a driven shaft, a rotating member freely mounted on the driving shaft, a support loosely mounted on the driving shaft and provided with an ecentric journal engaging with said rotating member, an intermediate shaft loosely mounted in said support, means for kinematically connecting the driving shaft and the auxiliary shaft, means for kinematically connecting the auxiliary shaft and the driven shaft, and means for braking the movement of the rotating member.

3. In a power-transmitting device, a driving shaft, a driven shaft, a rotating member freely mounted on the driving shaft, a support loosely mounted on the driving shaft and provided with an eccentric journal, a sleeve freely mounted on said journal and engaging with the rotating member, means for causing said sleeve to rotate on said journal, the said means comprising an intermediate shaft loosely mounted in the support, means for kinematically connecting the auxiliary shaft and the driven shaft, and means for braking the movement of the rotating member.

4. In a power-transmitting device, a driving shaft, a driven shaft, a rotating member freely mounted on the driving shaft, a support loosely mounted on the driving shaft and provided with an eccentric journal, a pinion loosely mounted on said journal and provided with a hub engaging with the rotating member, an intermediate shaft loosely mounted in the support, a first pinion rigidly secured on said intermediate shaft and meshing with the pinion mounted on the journal, a second pinion rigidly secured on the intermediate shaft, a pinion rigidly secured on the driving shaft and meshing with the second pinion rigidly secured on the intermediate shaft, a third pinion rigidly secured on the intermediate shaft, a pinion rigidly secured on the driven shaft and meshing with the third pinion rigidly secured on the intermediate shaft, and means for braking the movement of the rotating member.

5. In a power-transmitting device, a driving shaft, a driven shaft, a rotating member freely mounted on the driving shaft, a support loosely mounted on the driving shaft, two diametrally opposed auxiliary shafts loosely mounted in said support, cranks rigidly secured on the said shafts, a connecting rod connecting the said cranks and provided with a central journal engaging with the rotating member, means for kinematically connecting the auxiliary shafts to the driving shaft, means for kinematically connecting the auxiliary shafts to the driven shaft, and means for braking the movement of the rotating member.

CHRISTIAN DE LA BARRE DE NANTEUIL.